(12) United States Patent
Helmer (10) Patent No.: US 6,305,843 B1
(45) Date of Patent: Oct. 23, 2001

(54) REUSABLE CLOTHES DRYER LINT COLLECTION MITT AND METHOD OF MANUFACTURE

(76) Inventor: Lisa Dawn Helmer, 2918 - 11$^{th}$ Ave. W., Bradenton, FL (US) 34205

( * ) Notice: Subject to any disclaimer, the term of this patent is extended or adjusted under 35 U.S.C. 154(b) by 0 days.

(21) Appl. No.: 09/780,801

(22) Filed: Feb. 9, 2001

(51) Int. Cl.$^7$ .................................................. B65D 33/00
(52) U.S. Cl. ................................ 383/41; 206/278; 34/82
(58) Field of Search .............................. 34/82; 206/278; 383/41; 424/402; 32/40

(56) References Cited

U.S. PATENT DOCUMENTS

| | | | |
|---|---|---|---|
| D. 383,610 | * | 9/1997 | Cole et al. ............................. D4/137 |
| 5,052,127 | * | 10/1991 | Blake et al. ............................... 34/82 |
| 5,121,776 | * | 6/1992 | Kovach .................................... 141/98 |
| 5,301,806 | * | 4/1994 | Olson .................................... 206/278 |
| 5,651,188 | * | 7/1997 | Swanson et al. ......................... 34/82 |
| 5,671,983 | * | 9/1997 | Miller et al. ............................. 312/1 |
| 6,024,970 | * | 2/2000 | Woodward ............................ 424/402 |

\* cited by examiner

*Primary Examiner*—Henry Bennett
*Assistant Examiner*—Greg Warder
(74) *Attorney, Agent, or Firm*—Dorothy S. Morse (57) ABSTRACT

A reusable device, and a method of manufacture, for fast, efficient, fingernail preserving, and neat removal of accumulated lint from clothes dryer filters. The device comprises a mitt and an attached storage pouch having upper and lower ends that can be independently manipulated for the addition and removal of lint. The devices also comprise magnets for attachment of the pouch to a dryer so that it remains conveniently accessible for use. The mitt preferably has two thumbs for interchangeable right-handed and left-handed use. Applications may include, but are not limited to, use by homeowners and cleaning services to facilitate the repetitive task of removing accumulated lint from clothes dryer lint filters needed to promote safe use of clothes dryers in homes, school dormitories, apartment complexes, and other residence facilities, as well as in laundromats, other commercial cleaning establishments, hotel laundries, hospital laundries, and the laundry facilities of uniform rental services.

14 Claims, 5 Drawing Sheets

REUSABLE CLOTHES DRYER LINT COLLECTION MITT AND METHOD OF MANUFACTURE

BACKGROUND—FIELD OF INVENTION

This invention relates to devices used for removing accumulated lint from a clothes dryer lint filter, specifically to a reusable device, and a method for its manufacture, comprising a mitt component made of soft lint-attracting fabric and having a ridge-like bound seam to aid in lint collection, in combination with a lint storage pouch that has easily opening upper and lower ends, each of which can be independently opened and closed for the prompt addition or removal of clothes dryer lint from the pouch. Also, the mitt is attached to the pouch through an opening in one of its sides near to the upper end, so that when the upper end is opened, a hand can be inserted into the mitt to temporarily extend the mitt beyond the upper end of the pouch and use the bound seam of the mitt, as well as the soft lint-attracting mitt fabric, to neatly and efficiently retrieve accumulated lint from a clothes dryer lint filter with minimal lint fragment dispersal, securely hold onto the removed lint during its transport to the pouch, and subsequently transfer the collected lint into the pouch with minimal mess. Without the mitt, the fingernails and fingertips of the person removing the lint are typically used to separate accumulated lint from a clothes dryer lint filter, which often causes direct fingernail contact with the lint filter and fingernail damage, as well as for small fragments of the accumulated lint to be left behind on the filter, to collect under the fingernails used for lint filter cleaning, or to break away from the main body of retrieved lint and become dispersed into the room within which the dryer is located. Since accumulated lint is easily gathered into a compact mass by the ridge-like bound seam of the mitt and lint fragments are attracted to its soft fabric, the present invention helps to quickly separate the accumulated lint from a clothes dryer filter, remove more lint in less time than an uncovered hand attempting to perform the same task, and remove the lint with less damage to fingernails and chipping of fingernail polish that would otherwise occur when uncovered fingertips are used as the main tool for separating the accumulated lint from a clothes dryer filter. At any time after lint collection, the pouch can be easily emptied of lint by placing the pouch over a convenient waste container and opening the pouch's lower end to let gravity assist in the downward movement of lint into the waste container. Between uses, magnets are employed to attach the pouch to the outside surface of the clothes dryer housing, so that it remains conveniently accessible to those having the responsibility to remove and dispose of accumulated lint resulting from the clothes dryer operation. Also, the mitt preferably has two opposed thumbs so that it is readily available for both right-handed and left-handed use without accommodation. Applications may include, but are not limited to, use by residents, as well as professional cleaning service personnel, to facilitate the repetitive task of removing accumulated lint from clothes dryer lint filters that is necessary to promote safe use of clothes dryers in homes, school dormitories, assisted living facilities, apartment complexes, and other residence facilities. The device could also have commercial applications, such as but not limited to, use in public laundromats, other commercial cleaning establishments, and the laundries of hotels, motels, nursing homes, and hospitals, as well as the laundry facilities of companies providing uniform rentals.

BACKGROUND—DESCRIPTION OF PRIOR ART

Routine use and laundering of woven and knit fabrics, particularly cotton fabrics in clothing and linens, creates lint. As a result of the rubbing of one part of a fabric against another during use, as well as other forms of fabric contact with various objects encountered during use, threads employed to knit and weave fabrics can become broken. Subsequently when the fabrics are machine laundered and dried, broken fiber fragments are separated from the fabric and thereafter become accumulated in the form of lint on the respective lint filters of washers and dryers. Additional surface debris clinging to the fabrics prior to laundering, such as carpet fibers and pet hair, will also become separated from the fabrics during the cleaning process and deposited on the washer or dryer lint filters as part of the accumulated lint. To allow for efficient, sanitary, and safe operation of the washers and dryers used, accumulated lint needs to be periodically removed from the respective filters. Much of the coarse lint generated during a mechanized cleaning process is removed during the washing phase. This coarse lint is usually damp and generally poses little fire hazard threat. However, as clothes dryer lint is dry and generally comprised of smaller dimensioned particulate matter, if it is not frequently removed from clothes dryer lint filters, it will create a fire hazard risk. Further, since laundering merely sanitizes fabrics and does not remove all microbes from them, accumulated lint also will contain microbes, with more microbes being present when washers are overloaded so that clothes are not properly allowed to circulate during wash and rinse cycles. Therefore, complete and thorough removal of lint from washer and dryer lint filters, also helps to promote a more sanitary laundering result.

When cleaned simply with fingertips, lint removal from clothes dryer lint filters is an untidy process. Fragments of lint tend to cling to the filter even after multiple attempts are made to remove it, with other fragments sticking to the hand attempting to remove it or becoming readily dispersed as a fine dust into the area immediately surrounding the dryer. Several passes of the fingertips across a clothes dryer lint filter are also usually required to remove the bulk of the accumulated lint attached to it, unless a thick mat of accumulated lint has been allowed to amass in the filter. Although a thicker mat is often more readily removed, it is undesirable as it tends to pose a greater fire hazard risk. Other disadvantages of fingertip lint removal are that fragments of lint can cling to the hand employed to retrieve it and also collect under fingernails, requiring additional time to clean them Fingertip lint removal also leads to fingernail breakage and fingernail polish chipped through direct contact of the fingernails with the lint filter. The present invention overcomes the above-mentioned disadvantages by offering an alternative lint removal process that is faster, more efficient, neater, safer, and promotes more sanitary operation, with less lint remaining attached to the filter and less fragmented lint particles being dispersed into the air in the immediate vicinity of the dryer, as well as a less damaging result for the fingernails and/or fingernail polish of the person removing the lint. No device is known that has all of the advantages of the present invention.

SUMMARY OF INVENTION—OBJECTS AND ADVANTAGES

The primary object of this invention is to provide a reusable device for efficient removal and temporary storage of accumulated dryer lint from clothes dryer lint filters. It is a further object of this invention to provide a reusable lint-removing device that allows for rapid and thorough cleaning of clothes dryer lint filters. It is also an object of this invention to provide a reusable clothes dryer lint-removal device that is durable and easy to use. It is a further object of this invention to provide a reusable lint-removal device that can be rapidly and easily emptied of accumulated lint. A further object of this invention is to provide a reusable clothes dryer lint-removal device that can be stored between uses in the immediate vicinity of the dryer so as to be made easily accessible to a person needing to perform the lint removal task. It is also an object of this invention to provide a reusable lint-removal device that minimizes the risk of damage to fingernails and fingernail polish during clothes dryer lint filter cleaning. It is a further object of this invention to provide a reusable lint-removal device that can be cost effectively manufactured for widespread distribution and use. As described herein, properly manufactured and used, the present invention would enable rapid, thorough, and neat lint removal from clothes dryer filters. Since the mitt is directly attached to a lint storage pouch and the removed dryer lint can be immediately transferred to the pouch after collection while the mitt is still adjacent to the clothes dryer filter, there would be no uncovered transport of fragmented lint particles to a remote waste container that otherwise tends to result in the dispersal of at least a portion of those fragments into the area immediately surrounding a clothes dryer. Further, the mitt of the present invention has a ridge-like bound seam that tends to roll the lint into a compact mass as the mitt is drawn across a clothes dryer filter, instead of buckling and/or fractionating portions of the accumulated lint into easily dispersed fragments, as tends to happen when exposed fingertips and fingernails are used to separate the lint from a filter. Also, the fingernails of the person removing the lint would not be placed at risk for damage, as they are covered by the mitt and would not come in direct contact with the lint filter. In addition, any lint fragments dislodged from the clothes dryer filter while the bulk of the lint is being rolled into a compact mass, would tend to be immediately attracted to the soft material of the mitt and cling to it, minimizing the amount of lint becoming dispersed as a fine dust into the air immediately surrounding the dryer. When a clothes dryer lint filter is regularly cleaned, the present invention mitt tends to remove nearly all of the accumulated lint thereon in one pass of the mitt across the filter, multiple passes of the mitt being only anticipated for an unusually heavy deposit of lint, such as that expected during the laundering of new towels or blankets. The multiple-part magnetic closure in the upper end of the pouch of the present invention makes it easy to open, for rapid mitt extension beyond the upper perimeter of the pouch and prompt gathering of lint from a clothes dryer filter. Once the mitt is placed back inside the pouch, the magnetic closure can be quickly used to seal the pouch and prevent lint dispersal while the pouch is being transported back to its storage position on the outer surface of a clothes dryer housing, where it would remain conveniently situated for subsequent use. If the size of the magnets used for upper end closure is adequate, those magnets can also provide a means for attachment of the pouch to the dryer housing. Should smaller closure magnets be desired for the upper end, or a larger pouch be desired for commercial or large resident facility use, one or more additional magnets can be connected to the back of the pouch and used for dryer housing attachment. The lint holding capacity of the pouch would be adequate for multiple lint filter cleanings in the contemplated application, before emptying is required, preferably containing the lint from at least ten or twelve routine dryer cycles. Then, to dispose of the accumulated lint after it is transported in the pouch to a location remote from the dryer, the lint would be emptied into an appropriate waste container by simply opening the lower end of the pouch and letting gravity do most of the work in causing the downward release of lint into the waste container. In this way the placement of lint into an open container adjacent to the dryer is avoided, a practice that only allows for more of the finer lint fragments to become dispersed into the air surrounding the dryer each time a new quantity of lint or other discarded objects are added to the waste container. The lower end of the pouch can be closed by any easily-opened closure means, to include but not be limited to buttons, buttonholes, large snaps, hook and pile types of fasteners, magnets, zippers, spring-biased two-part handbag frame closures, crocheted frogs, and any combination thereof. The pouch preferably would be made from a lightweight durable material, such as nylon, so that it, the attached mitt, and a maximum contemplated quantity of accumulated lint can easily be supported by magnetic means against the outer surface of a dryer housing. It is also preferred that the pouch be made from a material to which the accumulated lint does not readily adhere. Further, although not critical, it is preferred that the pouch, the mitt, and the bottom and top pouch closures, all be made from washable materials. It is considered within the scope of the present invention for the pouch to have a lining when a pouch fabric is chosen for its surface decoration instead of its functional advantages, even though for weight considerations a lining is generally not preferred. Since the present invention has few parts to assemble, and different bottom closures are contemplated to accommodate user preference and price point considerations, the present invention could be cost effectively manufactured for widespread use.

The description herein provides the preferred embodiments of the present invention but should not be construed as limiting the scope of the clothes dryer filter lint removing invention. For example, variations in the length and width of the lint containing pouch; the number of magnets attached to the pouch; the size and configuration of the opening in the pouch to which the mitt is attached; the length and width dimensions of the mitt; the means of closure used for the lower end of the pouch; and the perimeter and thickness dimensions of the magnets used for closure of the upper end of the pouch; other than those shown and described herein may be incorporated into the present invention. Thus the scope of the present invention should be determined by the appended claims and their legal equivalents, rather than the examples given.

DETAILED DESCRIPTION OF PREFERRED EMBODIMENTS

Figures 1, 2, 3, 4:
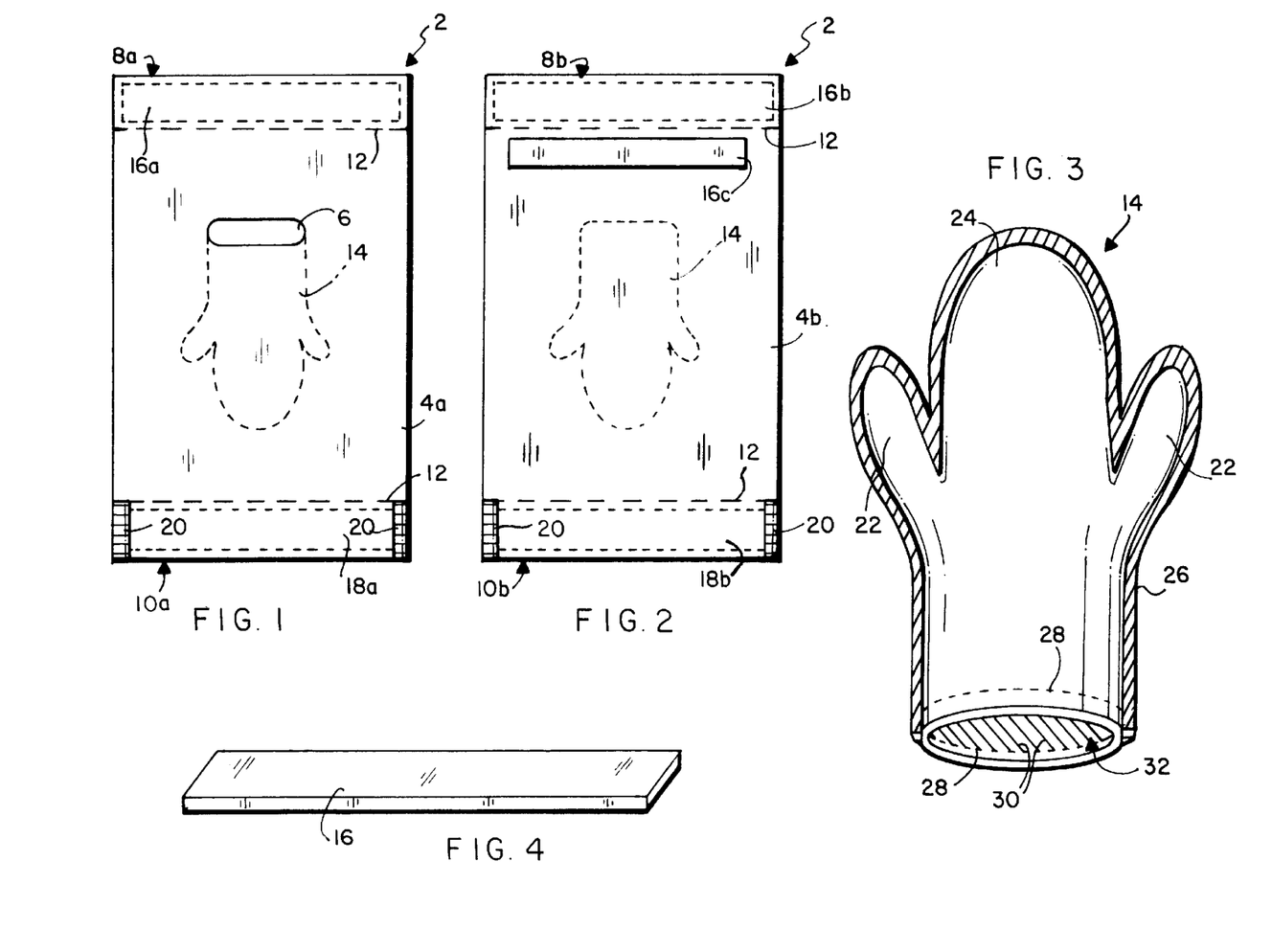
FIG. 1 is a front view of a first preferred embodiment of the present invention having a lint storage pouch with upper and lower closures, and a mitt attached to an opening in the lint storage pouch so that the opening allows for insertion of a hand into the mitt for use.
FIG. 2 is a back view of the first preferred embodiment having a lint storage pouch with upper and lower closures, a mitt positioned within the lint storage pouch, and a magnetic strip attached to the back of the pouch for use in attachment of the lint storage pouch to the side wall or door of a clothes dryer housing.
FIG. 3 is a perspective view of the mitt used in the first preferred embodiment, the mitt having two thumb members for alternative left-handed and right-handed use without accommodation and a ridge-like bound seam connecting the front and back halves of the mitt together and being adjacent to the finger containing member and the thumb members.
FIG. 4 is a perspective view of one possible configuration of the magnetic closure means used in the first preferred embodiment to close the top opening in the lint storage pouch, as well as a possible configuration for the magnetic attachment means for the lint storage pouch to the outer surface of a clothes dryer housing.

FIGS. 1 and 2 show a first preferred embodiment 2 of the present invention having a front pouch panel 4a, a back pouch panel 4b, a substantially horizontally extending connective opening 6 centered laterally through front pouch panel 4a, and a mitt 14 connected to opening 6. In addition, FIG. 1 shows front pouch panel 4a in first preferred embodiment 2 having an upper end with a front top edge 8a, a lower end with a front bottom edge 10a, two substantially horizontally extending rows of stitching 12 between front top edge 8a and front bottom edge 10a, an elongated front magnetic strip 16a adjacent to front top edge 8a, an elongated handbag frame front member 18a connected on its opposing ends to hinges 20 and positioned adjacent to bottom front edge 10a, and mitt 14 having two opposed thumb members, identified by the number 22 in FIG. 3. FIG. 1 also shows one row of stitching 12 being positioned above mitt 14 and adjacent to, although below, elongated front magnetic strip 16a, as well as a second row of stitching 12 being positioned below mitt 14 and adjacent to, although above, handbag frame elongated front member 18a. FIG. 2 further shows back pouch panel 4b in first preferred embodiment 2 having an upper end with a top back edge 8b, a lower end with a back bottom edge 10b, two rows of stitching 12 between top back edge 8b and back bottom edge 10b, an elongated back magnetic strip 16b positioned adjacent to top back edge 8b, and an elongated handbag frame back member 18b connected on its opposing ends to hinges 20, as well as an additional elongated back magnetic strip 16c attached to back pouch panel 4b between elongated back magnetic strip 18b and mitt 14, and in a horizontally extending orientation that is substantially parallel to top back edge 8b. FIG. 2 also shows one row of stitching 12 being positioned above mitt 14 and adjacent to elongated back magnetic strip 16b, and a second row of stitching 12 being positioned below mitt 14 and adjacent to handbag frame back member 18b. Although FIGS. 1 and 2 show a pouch being made from two pouch components, front pouch panel 4a and back pouch panel 4b, it is also considered to be within the scope of the present invention for the pouch to be made from one larger piece of fabric having the approximate combined dimension of front pouch panel 4a and back pouch panel 4b.

In FIG. 1, stitching 12 is shown in two places on front pouch panel 4a, to assist in sealing hidden elongated front magnetic strip 16a within a hemmed enclosure or pocket adjacent to front top edge 8a and hidden handbag frame front member 18a within a hemmed enclosure or pocket adjacent to bottom front edge 10a, and unless otherwise restricted, elongated front magnetic strip 16a and handbag frame front member 18a would be able to slide freely within its respective hemmed enclosure or pocket. In addition, in FIG. 2, stitching 12 is shown in two paces on back pouch panel 4b, to assist in sealing hidden elongated back magnetic strip 16b within a hemmed enclosure or pocket adjacent to top back edge 8b, and to seal hidden handbag frame back member 18b within a hemmed enclosure or pocket adjacent to bottom back edge 10b, and unless otherwise restricted, elongated back magnetic strip 16b and handbag frame back member 18b would be able to slide freely within its respective hemmed enclosure/pocket. Depending upon the order of the construction steps used during manufacture of first preferred embodiment 2, the stitching 12 employed adjacent to front top edge 8a and top back edge 8b could comprise a continuous filament of thread, or be independently applied. Similarly, the stitching 12 employed adjacent to bottom front edge 10a and bottom back edge 10b could comprise a continuous filament of thread, or be independently applied. Although not shown, additional stitching 12 could be applied as top stitching, adjacent to front top edge 8a and top back edge 8b, as well as bottom front edge 10a and bottom back edge 10b, to further restrict movement of elongated front magnetic strip 16a, elongated back magnetic strip 16b, handbag frame front member 18a, and handbag frame back member 18b within their respective hemmed enclosures. Also, although not shown, stitching 12 can be used to laterally join front pouch panel 4a to back pouch panel 4b. Stitching 12 used in a top-stitched position can also be employed adjacent to the seam joining front pouch panel 4a to back pouch panel 4b, on each side of the seam, to add strength to the material adjacent to the seam. Depending upon whether the hemmed enclosures or pockets formed by stitching 12 or the lateral connection of front pouch panel 4a to back pouch panel 4b is first performed, apertures can be left in the hemmed enclosures or pockets, on the inside of the pouch, between front pouch panel 4a and back pouch panel 4b for the insertion of elongated front magnetic strip 16a, elongated back magnetic strip 16b , handbag frame front member 18a, and handbag frame back member 18b, as well as the end-to-end connection of handbag frame front member 18a to handbag frame back member 18b with hinges 20 on each of their respective ends. Also, although not shown, once the respective closure structures are in place, stitching 12 can be used to seal such apertures. Although handbag frame front member 18a and handbag frame back member 18b are used to close the lower end of the pouch 4 formed by lateral connection of front pouch panel 4a to back pouch panel 4b, other types of easily opening lower end closure are also considered within the scope of the present invention, such as but not limited to the buttons 62 and frogs 64 shown in FIGS. 14 and 15, the buttons 62 and buttonholes 66 shown in FIG. 16, the two-part snaps 68a and 68b shown in FIG. 17, the hook-and-pile types of fasteners with hook members 70a and pile members 70b shown in FIG. 18, and the zipper 72 shown in FIG. 19.

FIGS. 1 and 2 also show mitt 14 having two opposed thumb members, identified by the number 22 in FIG. 3. Although two opposed thumb members 22 are preferred for easy lefthanded, as well as right-handed, use without accommodation, it is also considered within the scope of the present invention for mitt 14 to have only one thumb member 22, or no thumb members 22. Further when one or two opposed thumb members 22 are used, the person employing it for removal of accumulated lint, such as lint 46 in FIGS. 9 and 10, can place a thumb (not shown) in one thumb member 22, with the remaining fingers (not shown) all positioned together within the finger containing member of mitt 14, shown by the number 24 in FIG. 3, or in the alternative the smallest finger may be positioned within the remaining thumb member 22. Although not shown in FIGS. 1 and 2, it is also contemplated for the open end of mitt 14, shown in FIG. 3 by the number 32, to be connected to front pouch panel 4a by stitching similar to stitching 12 in FIGS. 1 and 2, with the combined cut edges of mitt 14 and opening 6 being positioned within the interior of the pouch formed by the joining of front pouch panel 4a to back pouch panel 4b when mitt 14 is in its stored position ready for use. Although opening 6 is shown having an elongated configuration with rounded ends, such a configuration is not critical to first embodiment 2, and it is also contemplated for the configuration of opening 6 to have other configurations, such as but not limited to that of an ellipse, rectangle, or circle. FIG. 1 also shows opening 6 positioned longitudinally approximately one-half the distance between the center of front pouch panel 4a and the stitching 12 adjacent to front top edge 8a. Also, although such longitudinal positioning of opening 6 on front pouch panel 4a is preferred, it is not critical to the present invention and opening 6 might be differently positioned for embodiments having a longer front pouch panel 4a, as well as those having a larger lint-holding capacity. FIGS. 1 and 2 shows front pouch panel 4a and back pouch panel 4b each having a substantially rectangular configuration. Although not limited thereto, a rectangular configuration is preferred so that the inside surfaces of front pouch panel 4a and back pouch panel 4b do not impede the downward movement of lint 46 toward lower front end 10a and lower front end 10b. Further, FIGS. 1 and 2 shows front pouch panel 4a and back pouch panel 4b having substantially the same length and width dimensions. However, it is also contemplated for back pouch panel 4b to be longer in length dimension than front pouch panel 4a, depending on bottom closure means used, such as those illustrated in FIGS. 14–19. Although both front pouch panel 4a and back pouch panel 4b, as well as mitt 14, could be made from many types of material or fabric, and have linings (not shown) if needed, in first preferred embodiment 2 it is preferred that front pouch panel 4a, back pouch panel 4b, and mitt 14 be made from washable materials or fabrics. In the most preferred embodiment of the present invention, mitt 14 would be made from a soft, stretchable, knitted, lint-adhering cotton fabric, and front pouch panel 4a, and back pouch panel 4b would each be made from a fabric, with a slick, non-adhering surface, such as nylon, to which lint 46 would not easily adhere.

Figures 8, 9:
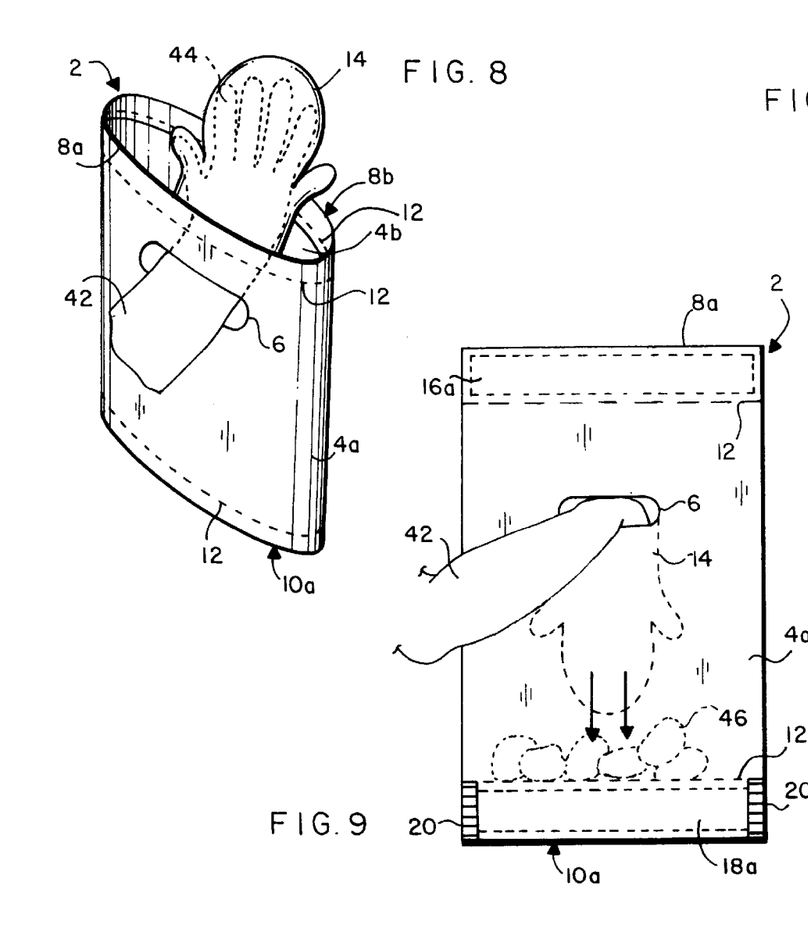
FIG. 8 is a perspective view of the mitt of the first preferred embodiment in a position of use, extending beyond the top edges of the lint storage pouch.
FIG. 9 is a front view of the first preferred embodiment showing transfer of collected lint from the mitt to the lint storage pouch.
Figure 16:
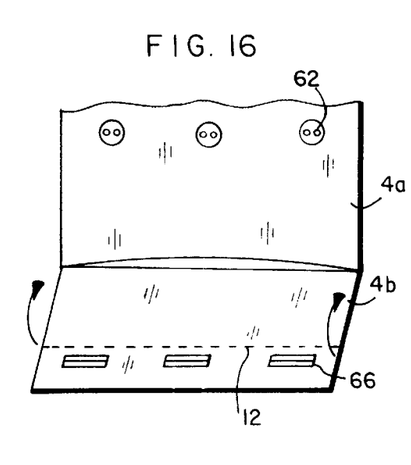
FIG. 16 is a front view of a third preferred embodiment of the present invention having a bottom end closure consisting of several spaced-apart buttons and buttonholes.
Figure 17:
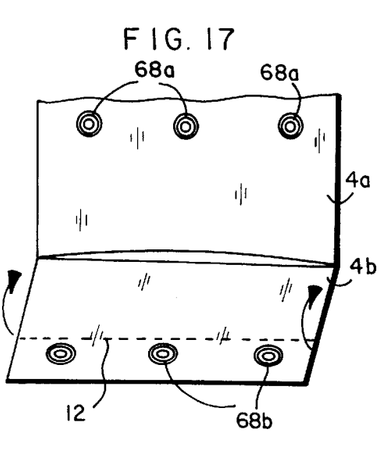
FIG. 17 is a front view of a fourth preferred embodiment of the present invention having a bottom closure consisting of several spaced-apart two-part snaps.
Figure 18:
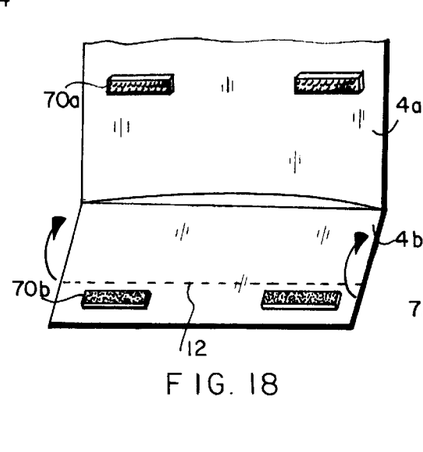
FIG. 18 is a front view of a fifth preferred embodiment of the present invention having a hookand-pile type of bottom end closure means.
Figure 19:
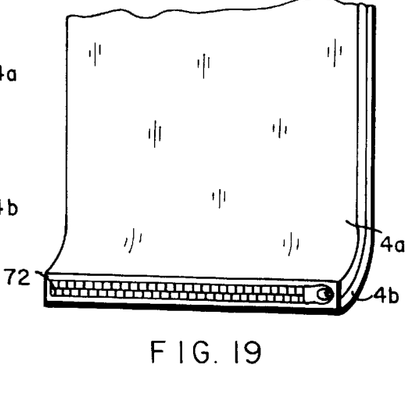
FIG. 19 is a front view of a sixth preferred embodiment of the present invention having a bottom end zipper closure.

Use of first preferred embodiment 2 for rapid, thorough, efficient, and neat removal of lint 46 from a clothes dryer filter 50, would involve placement of a hand, such as hand 44 in FIG. 8, through opening 6 and into mitt 14. Typically, all of the fingers of hand 44 would be placed into finger containing member 24 and the thumb of hand 44 would be placed into one of the thumb members 22 of mitt 14. If first preferred embodiment 2 is attached to the housing of a clothes dryer, such as dryer 52 in FIG. 12 or 13, back pouch panel 4b could be removed from dryer 52 prior to insertion of hand 44 into mitt 14, or after insertion of hand 44 into mitt 14. Once hand 44 is positioned within mitt 14, front top edge 8a is separated from top back edge 8b to place the upper end of first preferred embodiment 2 in an opened position so that mitt 14 can be extended beyond front top edge 8a and top back edge 8b for collection of lint 46. As shown in FIGS. 1 and 2, the two-part magnetic closure means 16, comprised of elongated front magnetic strip 16a and elongated back magnetic strip 16b , in the upper end of first preferred embodiment 2 allows for easy opening of the upper end, for rapid mitt 14 extension, and uninhibited, prompt gathering of lint 46. The fingers of hand 44, when inside mitt 14, would stretch mitt 14 as hand 44 is bent to gather lint 46 to remove it from lint filter 50, further assisting ridge-like bound seam 26 in the gathering of lint 46 without fragmentation. Once mitt 14 is withdrawn back between front pouch panel 4a and back pouch panel 4b, the magnetic closure means 16 can be quickly used to seal the pouch made from front pouch panel 4a and back pouch panel 4b, and prevent dispersal of lint 46 while the pouch is being transported back to its storage position on the outer surface of a clothes dryer housing 52, where it can remain conveniently situated for subsequent use. If the size of the magnets 16a and 16b used for upper end closure is adequate to uphold the weight of front pouch panel 4a, back pouch panel 4b, mitt 14, and lint 46, magnets 16a and 16b can also provide the means for attachment of the pouch to dryer 52. Should smaller closure magnets, such as small magnets 60 in FIG. 14, be desired for closure of the upper end, or a larger pouch be desired for commercial or large resident facility use, one or more additional magnets 16c can be added to back pouch panel 4b, as shown in FIG. 2. The lint holding capacity of the pouch would be adequate for multiple lint filter 50 cleanings in the contemplated application, before emptying is required. Assuming three to five loads of laundry are washed and dried every day, it is contemplated that the lint holding capacity of first preferred embodiment 2 would be sufficiently large for the accumulated lint 46 typically left behind in a dryer filter, such as dryer filter 50 in FIG. 11, over a minimum period of two to three days. To dispose of accumulated lint 46, and with its upper and lower ends in closed positions, the pouch formed from front pouch panel 4a and back pouch panel 4b would be transported to an appropriate waste container 48 in a location remote from dryer 52. Once positioned immediately above waste container 48, the lower end of the pouch would simply be opened to let gravity do most of the work in causing the downward release of lint 46 into waste container 48. Should any lint 46 remain in the pouch after initial opening of the lower end, the pouch can be gently shaken to separate any residual lint 46 from the pouch. In this way the placement of lint 46 into an open waste container (not shown) adjacent to dryer 52 is avoided, a practice that only allows for more of the finer fragments of lint 46 to become dispersed into the air surrounding dryer 52 each time a new quantity of lint 46 or other discarded objects (not shown) are added to the container. Once the desired amount of lint 46 is removed from the pouch, the lower end of the pouch can again be placed into its closed position and transported back to dryer 52 whereby the pouch can then be reattached to the housing of dryer 52 so as to be easily accessible for future use. A variety of easily-opened closure means are contemplated for the lower end of the pouch formed from front pouch panel 4a and back pouch panel 4b, such as but not limited to buttons 62 as shown in FIGS. 14 and 16, large snaps 68 as shown in FIG. 17, hook and pile types of fasteners 70 as shown in FIG. 18, magnets 16 or 60 similar to that shown in FIGS. 1 and 14, a zipper 72 as shown in FIG. 19, a spring-biased two-part handbag frame style of closure 78 as shown in FIGS. 1 and 2, crocheted frogs 64 as shown in FIGS. 14 and 15, and any combination thereof. Some of the preferred embodiments of the present invention require that back pouch panel 4b be slightly longer than front pouch panel 4a, so that back pouch panel 4b folds up over the bottom portion of front pouch panel 4a during closure. It is preferred that front pouch panel 4a and back pouch panel 4b be made from a lightweight durable material, such as nylon, so that the pouch formed therefrom, as well as attached mitt 14 and a maximum contemplated quantity of accumulated lint 46, can easily be supported by magnets 16 or 60 against the outer surface of a dryer housing 52. It is also preferred that the pouch made from front pouch panel 4a and back pouch panel 4b be constructed from a material to which accumulated lint 46 does not readily adhere. Further, although not critical, it is preferred that the pouch and mitt 14 be made from washable materials, and that mitt 14 be made from soft, lint-adhering, stretchable, knit material. Although not shown, it is considered within the scope of the present invention for the pouch made from front pouch panel 4a and back pouch panel 4b to have a lining when a pouch fabric is chosen for its surface decoration instead of its functional advantages, even though for weight considerations a lining is generally not preferred. Since the preferred embodiments of the present invention have few parts to assemble, and different bottom closures are contemplated to accommodate user preference and price point considerations, the present invention can be cost effectively manufactured for widespread use.

Although the dimensions of components in the present invention could vary and should not be limited hereto, the following dimensions are provided as an example of some of the dimensions more commonly used in the most preferred embodiment. It is contemplated for front pouch panel 4a and back pouch panel 4b to each have a stitched length dimension of approximately sixteen inches, and a stitched width dimension of approximately eleven inches. The side seams between front pouch panel 4a and back pouch panel 4b would typically range between one-half inch and three-fourths of an inch. In the alternative, when one large piece of fabric having the combined dimension of front pouch panel 4a and back pouch panel 4b is used to form the needed pouch, a single longitudinal seem would be used instead of opposing side seams. The stitching 12 adjacent to front bottom edge 10a and back bottom edge 10b would be at spaced-apart distances therefrom of approximately one inch. Also, the front handbag closure frame 18a and the back handbag closure frame 18b that are respectively placed in the enclosed pockets between front bottom edge 10a and stitching 12, and back bottom edge 10b and stitching 12, would have a maximum width dimension of approximately one-half inch. The stitching 12 adjacent to front top edge 8a and top back edge 8b would be at spaced-apart distances therefrom of approximately one-and-one-half inches. Also, the elongated front magnetic strip 16a and the elongated back magnetic strip 16b that are respectively placed in the enclosed pockets between front top edge 8a and stitching 12, and top back edge 8b and stitching 12, would have a maximum width dimension of approximately one inch. In place of elongated front magnetic strip 16a and elongated back magnetic strip 16b, the closure means for securing front top edge 8a to top back edge 8b could comprise six disk-shaped magnets, such as those shown in FIG. 14 by the number 60, each having the cross-sectional configuration of a circle with an approximate diameter dimension ranging between three-fourths of an inch and one inch, as well as a thickness dimension of approximately one-fourth of an inch. Two opposing sets of the disk-shaped magnets 60 would be placed approximately one-and-one-fourth inches to one-and-one-half inches from the side seams connecting front pouch panel 4a to back pouch panel 4b, with the third set of disk-shaped magnets 60 being approximately centered between the side seams connecting front pouch panel 4a to back pouch panel 4b. Further, opening 6 would be approximately five inches in length, with approximately three inches of front pouch panel 4a present on both sides of opening 6. Also, in the most preferred embodiment, opening 6 would be positioned between approximately one inch and three inches from the stitching 12 adjacent to front top edge 8a. In addition, for most purposes mitt 14 would have a maximum length dimension of approximately eight inches to nine inches, with thumb members 22 extending to an approximate maximum distance of five inches from opening 6. Also in the most preferred embodiment finger-containing member 24 would have a non-stretched width dimension of approximately four-and-one-half inches.

FIG. 3 shows mitt 14 of first preferred embodiment 2 of the present invention having two opposed thumb members 22 and a central finger containing member 24 therebetween for use in covering the three middle fingers (not shown), or all four fingers of the person using it to remove lint 46 from a dryer lint filter 50. Although FIG. 3 shows two thumb members 22, it is also considered to be within the scope of the present invention for mitt 14 to have only one thumb member 22, or no thumb members 22 and only a large finger containing member 24. FIG. 3 also shows mitt 14 having a bottom opening 32, an inside surface 30, seam lines 28, and a ridge-like bound seam 26 on its entire perimeter edge except for that surrounding bottom opening 32. It is through seam line 28 that mitt 14 becomes attached to opening 6. Although not critical, bound seam 26 in first preferred embodiment 2 would contain the cut edges of two opposing pieces of soft, stretchable, lint-attracting knit fabric, such as cotton, overcast or bound with thread, the detail of which is not shown in FIG. 3. Although not limited thereto and not shown, and provided herein as only one example of use, a buttonhole stitch could be used to secure the cut edges of bound seam 26 so that it is sufficiently bulky and protruding to form a ridge so as to be effective and efficient in gathering accumulated lint 46 from the lint filter 50 of a clothes dryer 52, and rolling it into an accumulated mass with little or no fragmentation. During such gathering of lint 46, it is expected that hand 44 inserted into mitt 14, as shown in FIG. 8, would stretch mitt 14 as the fingers on hand 44 fold around lint 46 to help contain it during transport. Further, and although not limited thereto, it is contemplated for ridge-like bound seam 26 to have a minimum height dimension of approximately one-eight of an inch, and a preferred height dimension of approximately one-fourth of an inch. Opposed thumb members 22 allow for immediate left-handed and right-handed use without accommodation. Since mitt 14 is directly attached to opening 6, the removed dryer lint 46 can be immediately transferred to the pouch formed with back pouch panel 4b and front pouch panel 4a after its collection while mitt 14 is still adjacent to the clothes dryer filter 50. Thus, there would be no uncovered transport of fragmented particles of lint 46 to a remote waste container, such as waste container 48 shown in FIG. 11, that otherwise tends to result in the dispersal of at least a portion of lint 46 into the area immediately surrounding a clothes dryer 52. Further, the ridge-like bound seam 26 of mitt 14 tends to roll lint 46 into a compact mass as mitt 14 is drawn across a clothes dryer filter 50, instead of buckling and/or fractionating portions of the accumulated lint 46 into easily dispersed fragments, as tends to happen when fingernails are used to separate lint 46 from filter 50. Also, since the fingernails of the person removing lint 46 are covered, they would not come in direct contact with filter 50 and be placed at risk for damage. In addition, any fragments of lint 46 dislodged from filter 50 while the bulk of lint 46 is being rolled into a compact mass, would tend to be immediately attracted to the soft material of mitt 14 and cling to it, minimizing the amount of lint 46 becoming dispersed as a fine dust into the air immediately surrounding dryer 52. When a clothes dryer lint filter 50 is regularly cleaned, the present invention mitt tends to remove nearly all of the accumulated lint thereon in one pass of mitt 14 across filter 50. Multiple passes of mitt 14 are only anticipated for an unusually heavy deposit of lint 46, such as that expected during the laundering of new towels or blankets (not shown).

Figure 11:
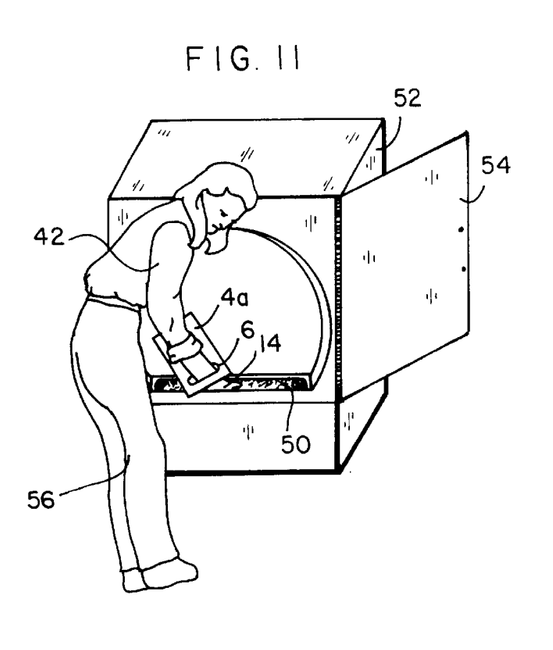
FIG. 11 is a perspective view of a person using the first preferred embodiment to clean accumulated lint from a clothes dryer lint filter.
Figure 12:
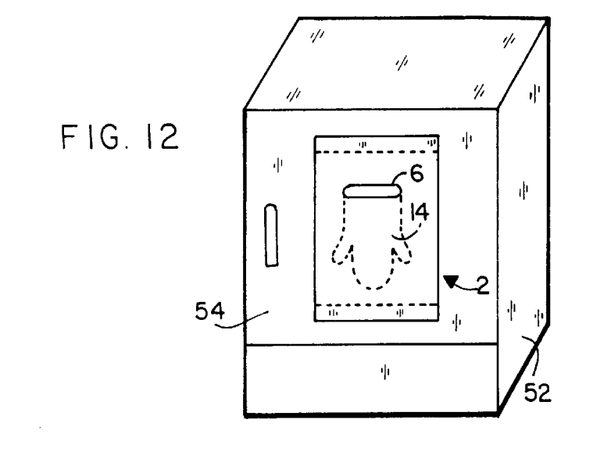
FIG. 12 is a perspective view of the first preferred embodiment attached to the door of a clothes dryer housing.

FIG. 4 shows one possible configuration of the magnetic strips 16a and 16b, as well as additional magnetic strips 16c, used in first preferred embodiment 2. Magnetic strips 16 similar to that shown in FIG. 4 can be used to close front top edge 8a against top back edge 8b, as shown by 16a and 16b in FIGS. 1 and 2. A magnetic strip 16 similar to that shown in FIG. 4 can also be attached to the outside surface of back pouch panel 4b, as shown in FIG. 2 by the number 16c, to help attach first preferred embodiment 2 to the outside surface of a dryer 52, as shown in FIG. 11, or to the door 54 of a dryer 52, as shown in FIG. 12. The length, width, and thickness dimensions of magnetic strip 16 is not critical, and would vary according to the weight of the material used for front pouch panel 4a, back pouch panel 4b, and mitt 14, as well the lint-holding capacity of front pouch panel 4a and back pouch panel 4b when joined together and sealed at upper and lower ends with easily opening closures, such as handbag frame front member 18a and handbag frame back member 18b. Although not limited thereto, magnetic strips 16 made from ferromagnetic materials are preferred, due to the inexpensive cost and widespread availability.

Figures 5, 6, 7:
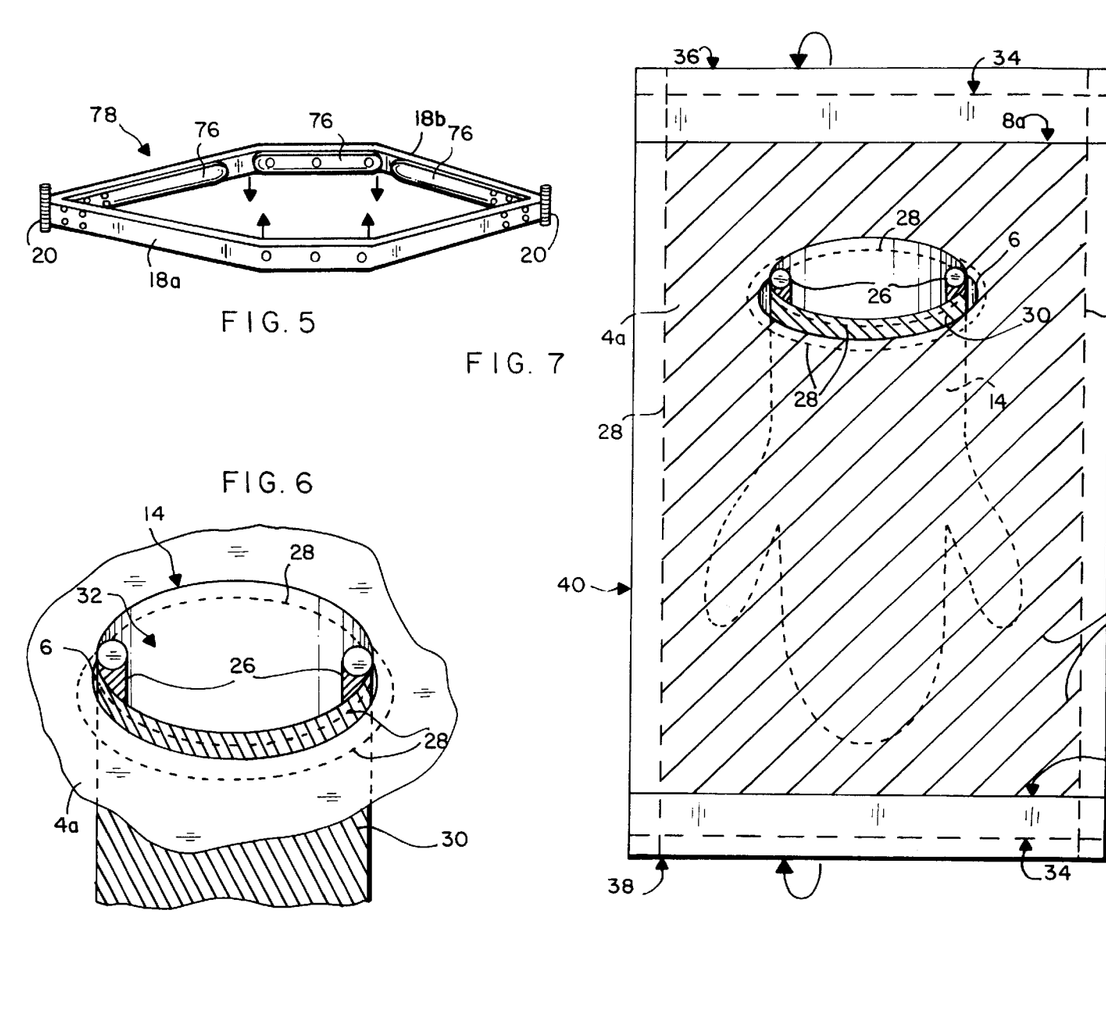
FIG. 5 is a perspective view of a two-part handbag frame style closure means for sealing and securing the bottom end of the lint storage pouch of the first preferred embodiment.
FIG. 6 is a perspective view of the mitt of the first preferred embodiment ready for attachment to the opening in the front panel of the lint storage pouch.
FIG. 7 is a back view of the front panel of the first preferred embodiment prior to folding and stitching.

FIG. 5 shows the two-part handbag frame style closure 78 used in first preferred embodiment 2 for closing back bottom edge 10b against front bottom edge 10a. FIG. 5 further shows two-part handbag frame style closure 78 having an elongated handbag frame back member 18b, an elongated handbag frame front member 18a, two hinges 20 with a different hinge 20 connecting handbag frame back member 18b to handbag frame front member 18a on each of their respective ends, and several inner support members 76 used to prevent inadvertent crimping or creasing of the flexible material from which handbag frame back member 18b and handbag frame front member 18a are manufactured, and any resulting interference that might otherwise prevent their proper operation. When handbag frame back member 18b is connected to handbag frame front member 18a with hinges 20, handbag frame back member 18b and handbag frame front member 18a are each biased into a closed position against the other. However, when handbag frame front member 18a is forced away from handbag frame back member 18b, both remain separated from the other until a closing force is applied to handbag frame front member 18a, handbag frame back member 18b, or both. An intermediate opened position is also possible between handbag frame front member 18a and handbag frame back member 18b.

FIGS. 6 and 7 show the positioning of mitt 14 immediately prior to attachment of mitt 14 to the opening 6 in front pouch panel 4a. FIG. 6 provides an enlarged view of opening 6 and the open end 32 of mitt 14, with opposing ridge-like bound seams 26 facing one another. Both FIG. 6 and FIG. 7 show opening 6 having a more circular perimeter dimension than previously shown in FIG. 1. FIGS. 6 and 7 also both show seam lines 28 around opening 6 and adjacent to open end 32 of mitt 14, being aligned for later connection with stitching, such as stitching 12 shown in FIGS. 1 and 2. FIG. 7 further shows the front pouch panel 4a of first embodiment 2 prior to folding and stitching. As shown by the uppermost arrow, top cut edge 36 can be folded at fold line 34, then folded again at front top edge 8a prior to being secured in place with stitching 12 (not shown in FIG. 7, but shown in FIG. 1) to form a hemmed enclosure or pocket for elongated front magnetic strip 16a. Similarly, and as shown by an opposing lower arrow, bottom cut edge 38 can be folded at fold line 34, then folded again at front bottom edge 10a prior to being secured in place with stitching 12 (not shown in FIG. 7, but shown in FIG. 1) to form a hemmed enclosure or pocket for elongated back magnetic strip 16b. If the type of stitching 12 used is configured to encase top cut edge 36 and bottom cut edge 38, to prevent fraying thereof, the step of folding at top and bottom fold lines 34 can be omitted during the formation of hemmed enclosures or pockets for elongated front magnetic strip 16a and elongated back magnetic strip 16b. FIG. 7 further shows the side cut edges 40 of front pouch panel 4a, as well as the side seam lines 28 used for connecting front pouch panel 41 to back pouch panel 4b. The number 30 identifies the lines indicating the back fabric surfaces of both mitt 14 and front pouch panel 4a. FIG. 7 shows the ridge-like bound seam 26 of mitt 14 positioned inside mitt 14 during the connection of mitt 14 to front pouch panel 4a. Once connection is complete, mitt 14 would be pushed through to opening 6 against the back fabric surface 30 of front pouch panel 4a for use, wherein the lint-gathering bound seam 26 of mitt 14 would be in an exposed position ready for use.

Figure 10:
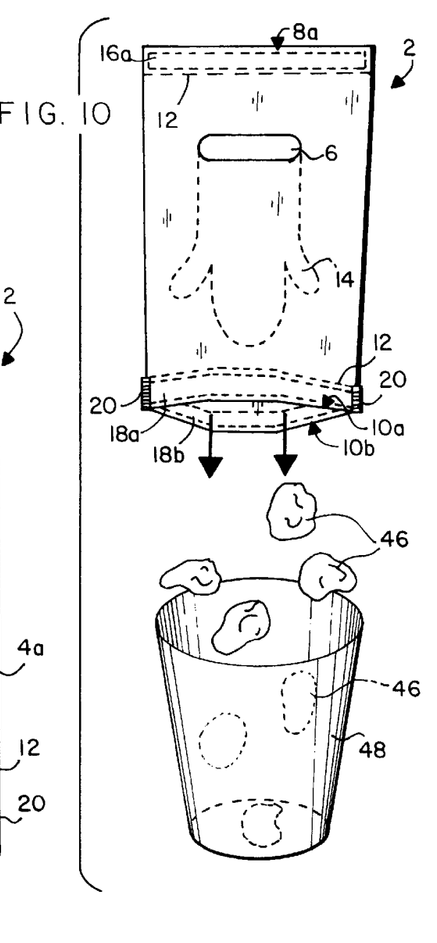
FIG. 10 is a front view showing lint being emptied from the lint storage pouch of the first preferred embodiment into a waste container.

FIGS. 8, 9 and 10 show mitt 14 in first preferred embodiment 2, respectively, in a position extending beyond front top edge 8a and top back edge 8b for the collection of dryer lint 46, in a position drawn back below front top edge 8a for release of lint 46 into the pouch formed from front pouch panel 4a and back pouch panel 4b, and in a downwardly facing non-active position while front bottom edge 10a is separated from back bottom edge 10b to allow transfer of lint 46 to a remote waste disposal container 48. FIG. 8 shows a human arm 42 inserted through opening 6, with the hand 44 connected thereto positioned within mitt 14. Although all four fingers on hand 44 are positioned within the central finger containing member of mitt 14, identified by the number 24 in FIG. 3, and the thumb on hand 44 is placed within one of the thumb members 22 of mitt 14, identified by the number 22 in FIG. 3, mitt 14 could also be used with the thumb on hand 44 positioned within finger containing member 24 with the fingers on hand 44, or with at least one of the fingers on hand 44 placed into the thumb member 22 shown unused in FIG. 8. Stitching 12 adjacent to front top edge 8a and top back edge 8, as well as adjacent to front bottom edge 10a and back bottom edge 10b, helps to keep the potentially unraveling top and bottom cut edges of front pouch panel 4a and back pouch panel 4b from interfering with the extension and withdrawal of mitt 14, or the downward movement of lint 46 once front bottom edge 10a and back bottom edge 10b are separated from one another, during repeated use of first preferred embodiment 2. Although not critical, during the extension of mitt 14 beyond front top edge 8a and top back edge 8, as well as during use of mitt 14 to collect lint 46, it is contemplated that front bottom edge 10a and back bottom edge 10b would be secured tightly against one another. FIG. 9 shows mitt 14 after lint collection, and when mitt 14 is already withdrawn below front top edge 8a and top back edge 8, in a downwardly hanging position between front pouch panel 4a and back pouch panel 4b. Arm 42 is still inserted through opening 6, with mitt 14 having a substantially open and planar configuration that allows collected lint 46 to fall into the bottom of the pouch created by the joining of front pouch panel 4a and back pouch panel 4b. When hand 44 is still within mitt 14 and lint 46 is being transferred from mitt 14 to the interior space between front pouch panel 4a and back pouch panel 4b, it is contemplated that front top edge 8a would usually be in a closed position against top back edge 8b and secured thereto by elongated front magnetic strip 16a being firmly positioned against elongated back magnetic strip 16b (not shown in FIG. 9). However, front bottom edge 10a would necessarily be in a closed position against back bottom edge 10b to keep lint 46 between front pouch panel 4a and back pouch panel 4b, being secured to one another by handbag frame front member 18a in a position firmly biased against handbag frame back member 18b (not shown in FIG. 9) and held to handbag frame front member 18a by hinges 20. To empty lint 46 from first preferred embodiment 2, FIG. 10 shows first preferred embodiment 2 positioned above a waste container 48, with handbag frame front member 18a separated from handbag frame back member 18b so as to maintain front bottom edge 10a and back bottom edge 10b in positions separated from one another. Although front top edge 8a would usually be in a closed position against top back edge 8b, secured together by elongated front magnetic member 16a and elongated back magnetic member 16b (not shown in FIG. 10), such closure is not critical. FIG. 10 shows the stitching 12 that helps to form the enclosures or pockets within front pouch panel 4a and back pouch panel 4b for handbag frame front member 18a, handbag frame back member 18b, elongated front magnetic member 16a and elongated back magnetic member 16b (not shown in FIG. 10). After all lint 46 is emptied from first preferred embodiment 2 into waste container 48, front bottom edge 10a can be again placed in a closed position against back bottom edge 10b, and first preferred embodiment 2 attached to the housing of a clothes dryer, such as clothes dryer 52 shown in FIGS. 11–13, so that it can be readily accessible for subsequent use.

Figure 13:
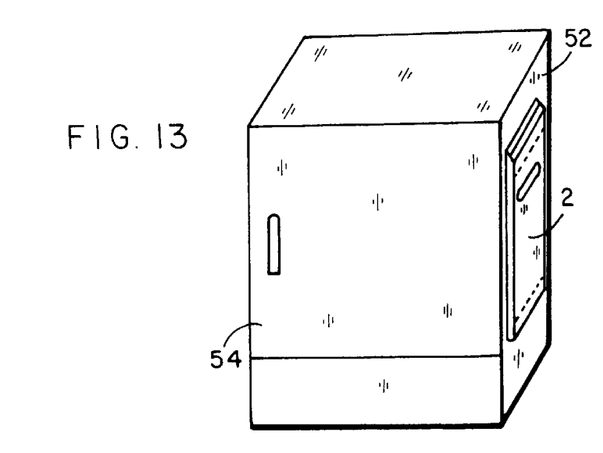
FIG. 13 is a perspective view of the first preferred embodiment attached to the outside surface of a clothes dryer.
Figures 14, 15:
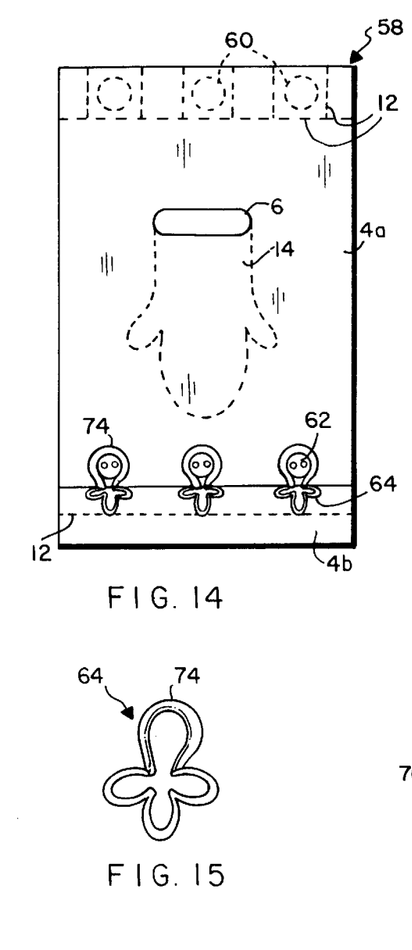
FIG. 14 is a front view of a second preferred embodiment of the present invention with the bottom closure of the lint storage pouch consisting of identical numbers of buttons and frogs, the enlarged loop of each frog engaging a different one of the buttons, and the top end closure means for the lint storage pouch consisting of several small magnets.
FIG. 15 is an enlargement of one possible configuration of a frog used in the second preferred embodiment and having an enlarged stretchable loop adapted to fit around a selected size of button.

FIG. 11 shows a person 56 using mitt 14 to clean a clothes dryer filter 50, while FIGS. 12 and 13 show first preferred embodiment 2 being conveniently stored in a position attached to the outer surface of clothes dryer 52. FIG. 11 shows person 56 having one arm 42 inserted through opening 6 in front pouch panel 4a, and mitt 14 extended beyond one end of front pouch panel 4a. While bending over to access lint filter 50, with filter 50 remaining in its usable position within clothes dryer 52, person 56 employs mitt 14 to easily and quickly gather the lint 46 (not shown in FIG. 11) that has collected upon filter 50 during use of clothes dryer 52. If desired, lint filter 50 could be removed from clothes dryer 52 for the lint removal process, however, unless the lint collecting surface of lint filter 50 is only accessible by removing filter 50 from clothes dryer 52, it would be the preference of person 56 as to whether filter 50 would be removed from clothes dryer 52 during lint removal. Typically, one pass of mitt 14 over the lint collecting surface of filter 50 is sufficient for removal of lint 46 from filter 50, due to the effectiveness of ridge-like bound seam 26 (shown in FIG. 3) on mitt 14 being able to roll lint 46 into a compact mass, as well as the soft material used to make mitt 14 which causes fragments of lint 46 to be attracted to mitt 14 and adhere to it during the lint removal process. FIG. 12 shows first preferred embodiment 2 being attached to a dryer door 54, and FIG. 13 shows first preferred embodiment 2 being attached to the right side of a clothes dryer housing 52, both in positions readily accessible for convenient use by person 56. Although not shown, first preferred embodiment 2 could also be attached to the left side of dryer housing 52, or placed upon the top of dryer housing 52. Thus, when person 56 approaches clothes dryer 52 with the intent of removing lint 46 from filter 50, person 56 can optionally grip first preferred embodiment 2 with one or two hands, separate first preferred embodiment 2 from clothes dryer 52, and then insert one arm 42 through opening 6, followed by extension of mitt 14 beyond front top edge 8a and top back edge 8 to prepare mitt 14 for lint removal use. In the alternative, it is also contemplated for person 56 to use the attachment of first preferred embodiment 2 to clothes dryer 52 as an anchoring point to steady first preferred embodiment 2 while arm 42 is inserted through opening 6, after which first preferred embodiment 2 would be separated from clothes dryer 52, and mitt 14 extended into an exposed position for use.

FIGS. 14–19 show examples of various alternative closures contemplated for use in securing front bottom edge 10a to back bottom edge 10b. FIG. 14 shows a second preferred embodiment 58 of the present invention having a bottom closure consisting of several buttons 62 and several crocheted frogs 64. Also, the top closure of second preferred embodiment 58 consists of several small magnets 60, instead of opposing elongated magnetic strips 16. In many of the embodiments, back pouch panel 4b is slightly longer than front pouch panel 4a, to allow back pouch panel 4b to fold over the bottom portion of front pouch panel 4a to provide bottom pouch closure. FIG. 15 shows an enlargement of one possible configuration of frog 64 having an enlarged upper loop 7 adapted to fit around the perimeter dimension of the buttons 62 selected for use. Since frogs 64 are typically crocheted, upper loop 74 would be expected to exhibit some stretching capability. FIG. 16 shows a first alternative bottom closure contemplated for first preferred embodiment 2 and second preferred embodiment 58, consisting of several buttons and buttonholes 66. FIG. 17 shows a second alternative bottom closure contemplated for first preferred embodiment 2 and second preferred embodiment 58, consisting of several two-part snaps, comprising snap members 68*a* and 68*b*. FIG. 18 shows a third alternative bottom closure contemplated for first preferred embodiment 2 and second preferred embodiment 58, consisting of several two-part fasteners each comprising a hook member 70*a* and a pile member 70*b*. The number, size and perimeter configuration of hook members 70*a* and pile members 70*b* is not critical as long as they provide for secure closure of front pouch panel 4*a* and back pouch panel 4*b*. FIG. 19 shows a fourth alternative bottom closure contemplated for first preferred embodiment 2 and second preferred embodiment 58, consisting of a zipper 72 extending substantially the full width of front pouch panel 4*a* and back pouch panel 4*b*. Although in FIG. 19 the bottom end of back pouch panel 4*b* may appear to be longer than front pouch panel 4*a*, both have the same approximate length dimension. The curvature of the bottom end of first preferred embodiment 2 is for illustrative purposes only so that zipper 72 is not hidden from view. Although for maximum efficiency in emptying the pouch of collected lint 46, zipper 72 should extend substantially across front pouch panel 4*a* and back pouch panel 4*b*, such extension is not critical.

What is claimed is:

1. A reusable clothes dryer lint removal device for separation of accumulated lint from a clothes dryer lint filter, temporary storage of the removed lint, as well as lint disposal, said device comprising:

a lint storage pouch with an upper end and a lower end, each of which is configured for movement between an opened position and a closed position independently from the other to allow prompt addition and removal of clothes dryer lint to and from said pouch, said pouch also having a connective opening near to said upper end, said upper end and said lower end each being securely sealed when in said closed position so as to allow no escaping of lint;

a mitt having a protruding bound seam and an open end, said open end being sufficiently large to allow insertion of a human adult hand, said mitt also being made from soft, lint-attracting fabric; and said open end in said mitt being attached to said connective opening in said pouch so that when said upper end is opened, a hand can be inserted into said mitt to temporarily extend said mitt beyond said upper end and allow said protruding bound seam of said mitt to assist in removing accumulated lint from a clothes dryer lint filter, as well as allow said soft lint-attracting fabric to attract and collect lint fragments, and thereafter deposit said collected lint into said pouch when said mitt is withdrawn back into said pouch for temporary storage until a next use.

2. The device of claim 1 wherein said mitt further comprises two opposing thumb members separated by a centrally positioned finger-containing member.

3. The device of claim 1 wherein said pouch further comprises a front pouch panel and a back pouch panel, and wherein said upper end further comprises a plurality of magnets, and further wherein at least one of said magnets is connected to said front pouch panel and at least one of said magnets is connected to said back pouch panel.

4. The device of claim 3 wherein said magnets are selected from a group consisting of elongated magnets, rectangular magnets, and magnets having a circular cross-sectional configuration.

5. The device of claim 1 wherein said pouch further comprises a front pouch panel and a back pouch panel, wherein said lower end comprises a multiple part fastening means with at least one part of said multiple-part fastening means being connected to said front pouch panel and at least one part of said multiple-part fastening means being, connected to said back pouch panel, and further wherein said multiple part fastening means is selected from a group consisting of magnets, handbag frames, buttons and buttonholes, buttons and frogs, zippers, hook-and-pile types of fasteners, and snaps.

6. The device of claim 1 wherein said pouch further comprises a back pouch panel and an additional magnet is connected to said back pouch panel, said additional magnet being configured and positioned so as to allow support of said pouch against a clothes dryer housing.

7. The device of claim 1 wherein said pouch is made from nylon fabric, and wherein said mitt component comprises soft, stretchable, knit cotton fabric.

8. A reusable clothes dryer lint removal device for separation of accumulated lint from a clothes dryer lint filter, temporary storage of the removed lint, as well as lint disposal, said device comprising:

a lint storage pouch with an upper end and a lower end, each of which is configured for movement between an open position and a closed position independently from the other to allow prompt addition and removal of clothes dryer lint to and from said pouch, said pouch also having a connective opening near to said upper end, said upper end and said lower end each being securely sealed so as to allow no escaping of lint when in said closed position;

a mitt having a protruding bound seam and an open end, said open end being sufficiently large to allow insertion of a human adult hand, said mitt also being made from soft, lint-attracting fabric;

attachment means for support of said pouch against a clothes dryer housing; and said open end in said mitt being attached to said connective opening in said pouch so that when said upper end is opened, a hand can be inserted into said mitt to temporarily extend said mitt beyond said upper end and allow said protruding bound seam of said mitt to assist in removing accumulated lint from a clothes dryer lint filter, as well as allow said soft lint-attracting fabric to attract and collect lint fragments, and thereafter deposit said collected lint into said pouch when said mitt is withdrawn back into said pouch for temporary storage until a next use.

9. The device of claim 8 wherein said mitt further comprises two opposing thumb members separated by a centrally positioned finger-containing member.

10. The device of claim 8 wherein said pouch further comprises a front pouch panel and a back pouch panel, and wherein said upper end further comprises a plurality of magnets, and further wherein at least one of said magnets is connected to said front pouch panel and at least one of said magnets is connected to said back pouch panel.

11. The device of claim 10 wherein said magnets are selected from a group consisting of elongated magnets, rectangular magnets, and circular magnets.

12. The device of claim 8 wherein said pouch further comprises a back pouch panel, and further wherein said attachment means is selected from a group consisting of magnets connected to said upper end of said pouch and additional magnets attached to said back pouch panel.

13. The device of claim 8 wherein said pouch further comprises a front pouch panel and a back pouch panel, wherein said lower end comprises a multiple part fastening means with at least one of said part being connected to said front pouch panel and at least one of said parts being connected to said back pouch panel, and further wherein said multiple part fastening means is selected from a group consisting of magnets, handbag frames, buttons and buttonholes, buttons and frogs, zippers, hook-and-pile types of fasteners, and snaps.

14. The device of claim 8 wherein said pouch is made from nylon fabric, and wherein said mitt component comprises stretchable knit cotton fabric.

* * * * *